Dec. 10, 1963 R. J. STAMETS 3,114,087
TERMINAL LEAD STRUCTURE FOR ELECTRICAL CAPACITORS
AND METHOD OF MAKING THE SAME
Filed Sept. 26, 1960

Inventor:
Richard J. Stamets,
by Sidney Greenberg
His Attorney.

United States Patent Office 3,114,087
Patented Dec. 10, 1963

3,114,087
TERMINAL LEAD STRUCTURE FOR ELECTRICAL CAPACITORS AND METHOD OF MAKING THE SAME
Richard J. Stamets, Glens Falls, N.Y., assignor to General Electric Company, a corporation of New York
Filed Sept. 26, 1960, Ser. No. 58,359
6 Claims. (Cl. 317—230)

The present invention relates to electrical capacitors and, more particularly, to a tantalum lead for such capacitors which is readily solderable to other metallic leads.

Because of its relatively high degree of chemical inertness and its ability to form an insulating anodic oxide of controlled thickness and excellent electrical properties for capacitor purposes, tantalum has been extensively used as electrode material in various types of electrical capacitors, and particularly in capacitors of electrolytic type. Where tantalum electrodes are used, e.g., in the form of foil, sintered slug or other configuration, it is usually necessary to employ tantalum also for the leads joined to the tantalum electrodes in order to maintain good electrical characteristics, especially at the connection of the lead with the electrode. However, the presence of the anodic oxide film on the tantalum lead, which is formed thereon in the course of anodizing the tantalum electrode having the lead attached thereto, makes it extremely difficult if not impossible to solder the tantalum lead to other leads of solderable material for the purpose of connecting the capacitor to a circuit. Even where the tantalum lead has not been anodically oxidized, its formation of a film by exposure to oxidation conditions will also result in a difficultly solderable surface.

Attempts have been made in the past to weld the tantalum lead to other lead members, but the resulting joints have often been the source of trouble due to insufficient mechanical strength or poor electrical contact. Electrolytically plating the tantalum leads with solderable materials has not in general proved satisfactory because the plating so formed has been found to strip readily from the tantalum lead when subjected to flexing stress. Moreover, electroplating processes for coating the leads are not suitable for use where the leads are already joined to anodized capacitor electrodes, since the cathodic connection of the electrode required by an electroplating process would damage the capacitor by deterioration of the anodic oxide film formed thereon. Mechanical crimping or interlocking of a tantalum lead to a lead of solderable metal has also been tried, but this type of joint has been found to cause noise in electronic circuits and is, therefore, not acceptable.

It is an object of the invention to provide a tantalum member which may be readily joined to other metallic members.

It is another object of the invention to provide a tantalum lead for electrical capacitors which can be conveniently soldered to solderable metallic leads.

It is a further object of the invention to provide a capacitor and lead structure therefor of the above type and a process for making the same which overcome the disadvantages of the prior art capacitor lead structures and methods.

It is still another object of the invention to provide a method of chemical deposition of a solderable material on a tantalum lead wire after the latter has been formed with a dielectric oxide film thereon.

Other objects and advantages will become apparent from the following description taken in conjunction with the appended claims.

With the above objects in view, the present invention comprises a capacitor lead structure comprising a tantalum lead member, a palladium coating on the surface of the tantalum lead member, a nickel coating deposited on the thus palladium-coated lead member, and a solderable metallic member soldered to the nickel-coated tantalum lead member.

In the process provided in the invention for making the above structure, the tantalum lead surface is pretreated with a sensitizing solution containing palladium in order to provide for intimate adherence of the nickel coating which is thereafter applied, and the nickel coating is deposited by chemical means thereafter on the palladium-coated surface.

By virtue of the method thus provided, the tantalum is furnished with a readily solderable coating of nickel even in the presence of an anodic oxide film on the tantalum lead which has been produced thereon in the usual procedure of anodizing a tantalum capacitor electrode having the lead attached thereto.

The invention will be better understood from the following description taken in conjunction with the accompanying drawing, in which.

Figure 1:
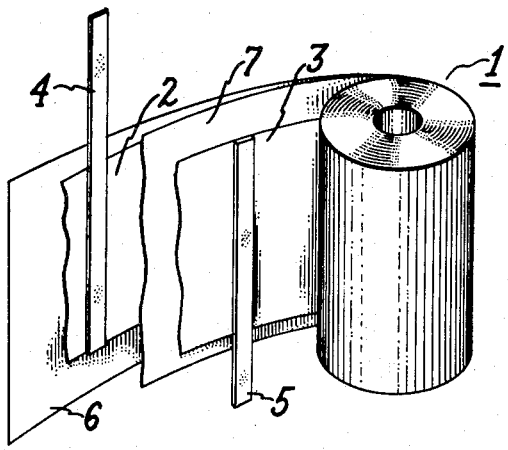
FIG. 1 illustrates a capacitor roll section of electrolytic type to which the present invention is applicable.

Referring now to the drawing, and particularly to FIG. 1, there is illustrated a capacitor 1 of electrolytic type comprising foil electrodes 2 and 3, which are preferably of tantalum but which may be of any other suitable film-forming metal, and having terminal leads or tap straps 4 and 5 of tantalum suitably affixed by welding or otherwise to the respective electrode foils and extending from opposite sides thereof. Foil electrodes 2 and 3 are separated from each other by one or more spacer strips 6 and 7 made of suitable porous insulating material such as kraft paper, the foils and spacer strips being interwound into a compact roll as shown.

Figure 2:
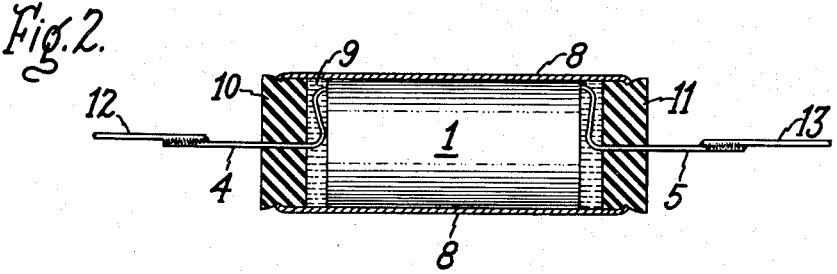
FIG. 2 shows the assembly of the capacitor roll section of FIG. 1 in a casing and with the lead members soldered to other metallic leads in accordance with the invention.

FIG. 2 shows the assembly of the wound capacitor section 1 into a casing 8 containing a suitable electrolyte 9, such as an aqueous ammonium pentaborate-glycol solution, in which the roll 1 is immersed. Casing 8 is fluid-tightly sealed at opposite ends with insulating plugs or disks 10 and 11 around which the casing wall is crimped and through which tantalum leads 4, 5 respectively extend. In accordance with anodizing processes well known in the art, such as by anodization in an electrolyte solution prepared from a mixture of ethylene glycol, water, boric acid and ammonium hydroxide, tantalum electrode foils 2 and 3 are provided, prior to assembly in capacitor roll 1, with anodic tantalum oxide dielectric films on their surfaces. In a usual procedure, tantalum leads 4 and 5 are already attached to the foils during such anodizing processes and accordingly are likewise formed with similar anodic films, on at least part of their surfaces, although it will be understood that non-anodized tantalum leads may instead be attached to the foil electrodes after the latter are anodized, if so desired.

Lead members 12 and 13, composed of any desired solderable metal such as copper, nickel, tin-plated copper wire, copper-clad iron, zinc, brass, or alloys of these metals which are readily solderable with common flux and solder composition, are soldered to tantalum terminal leads 4 and 5 after the latter have been treated in accordance with the invention, as more fully described hereinafter, to render them easily solderable.

Figure 2A:
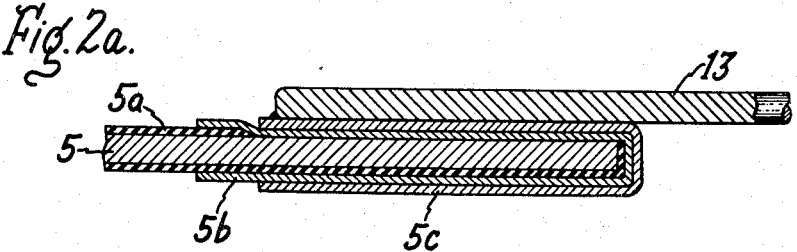
FIG. 2a is an enlarged detailed view of the soldered joint between the lead members illustrated in FIG. 2.

FIG. 2a shows in cross-section an enlarged detail view of the solder joint between tantalum lead 5 and outside lead 13. Tantalumn lead 5 has an anodic oxide film 5a thereon, a palladium layer 5b over the oxide film, and a nickel coating 5c deposited over the palladium-coated tantalum lead. Soldered to the nickel-coated tantalum lead is the outside lead 13 of copper or the like. While the anodic oxide film 5a is shown removed from the area of tantalum lead 5 underlying lead 13 so that an electrical conducting path is provided between the two leads, the exact structure which results from the described process or the mechanism involved therein is not known. The conduction between the leads may, for example, occur through minute fissures or point defects in the oxide layer into which the palladium-nickel coatings flow, or the temperature evolved in the soldering operation may cause the oxide layer to rupture and thereby provide conduction paths.

While the palladium layer 5b is shown as a continuous coating, the palladium need not be in a continuous layer and may be in the form of separated coating areas. Even in the latter form the nickel subsequently deposited will spread and be sufficiently anchored by the palladium deposits to the tantalum lead to form a tightly adherent, homogeneous and continuous coating on the latter member.

It will be understood that the particular type and construction of electrical capacitor described and illustrated is disclosed only by way of example, and that the invention is applicable to other types of capacitors which utilize tantalum leads. For example, the capacitors may have electrodes which are of a sintered slug form of known type and having tantalum leads. Or the electrodes may be of coiled or straight wire form and which may be of tantalum and have an extended portion serving as a lead, or to which a tantalum lead is secured. The capacitor may be of known dry oxide type, using no liquid electrolyte, and having tantalum leads or components to which other metallic members are to be joined.

In preparing a tantalum member for the nickel-coating operation, the tantalum member is cleaned and degreased if necessary, and then is treated by applying on the cleaned surface thereof an aqueous sensitizing solution containing a palladium salt. Thereafter, the thus-treated tantalum member is plated with nickel by means of a chemical reduction process. For this purpose, a plating solution of the nickel cation-hypophosphite anion type is used for application to the tantalum surface. This procedure produces a non-porous, tightly adherent uniform metallic coating on the tantalum surface which permits soldering by any conventional method to other solderable metallic members, such as mentioned above.

The sensitizing solution used for pre-treatment of the tantalum surface comprises an aqueous solution of a soluble salt of palladium, such as the chloride, nitrate, bromide or sulfate. The concentration of the palladium salt is preferably at least 10 parts per million, and the upper limit is determined by the salt solubility. However, highly concentrated solutions are unnecessary and undesirable because of cost and contamination problems. Preferably, at least about 5 percent of an acid such as nitric acid and a trace of a non-ionic type of wetting agent, such as polyoxyethylene esters, should be incorporated in the sensitizing bath composition. While more uniform results may be obtained by incorporation of the wetting agent, its use is not essential. An example of a palladium sensitizing solution which has proved suitable is as follows, the proportions being in percent by weight:

Example I

| | Percent |
|---|---|
| Palladium nitrate, $Pd(NO_3)_2$ | 0.01 |
| Nitric acid | 7 |
| Water | 93 |

The nickel plating solution essentially is an aqueous solution of a soluble nickel salt and a hypophosphite, the nickel salt serving as the source of nickel ions for plating the tantalum and the hypophosphite serving as the reducing agent. The hypophosphite may be that of an alkali metal, alkaline earth metal, ammonium salt or hypophosphorous acid. The solution preferably has a pH of about 5, but this may vary from about 3 to about 6, and an organic salt material such as an alkali citrate or an alkali acetate is preferably incorporated to serve as a buffer in maintaining the optimum pH value and to keep the nickel salt in solution.

The above type nickel plating solution is not novel and is disclosed, for example, in Patent 2,532,283.

Specific nickel plating solutions of the above type which have been found satisfactory in practicing the present invention are as follows, each having a pH of about 5, the proportions being in percent by weight:

Example II

| | Percent |
|---|---|
| Nickel sulfate, $NiSO_4\text{–}6H_2O$ | 3.3 |
| Sodium citrate, $Na_3C_6H_5O_7\text{–}2H_2O$ | 1.5 |
| Sodium acetate, $NaC_2H_3O_2\text{–}3H_2O$ | 0.5 |
| Sodium hypophosphite, $NaH_2PO_2\text{–}H_2O$ | 1.0 |
| Sulfuric acid | 0.4 |
| Water | 93.3 |

Example III

| | |
|---|---|
| Nickel chloride hexahydrate | 3.0 |
| Sodium hypophosphite | 1.0 |
| Sodium hydroxide | 2.0 |
| Glycollic acid | 3.7 |
| Water | 90.3 |

Example IV

| | |
|---|---|
| Nickel acetate | 3.0 |
| Sodium hypophosphite | 1.0 |
| Sodium citrate | 0.8 |
| Glacial acetic acid | 0.5 |
| Water | 94.7 |

The coating obtained by the nickel plating process is not composed purely of nickel but normally contains varying amounts of phosphorus, e.g., 7 to 12%. Accordingly, the reference to the nickel coating in the specification and claims is not intended to exclude the presence of such material or other substances not affecting the function of the nickel coating as herein described.

A typical process which may be carried out in practicing the invention is as follows, it being understood that the specific procedure, sequence thereof and values herein stated are given for the purposes of illustration only and are not intended to limit the scope of the invention.

After a tantalum foil electrode with tantalum tap strap welded thereto is subjected to a conventional anodizing process to form a dielectric oxide film thereon, the foil is interwound with a similar tantalum foil electrode and insulating spacer sheets interposed therebetween to form a capacitor roll, which is assembled in a casing containing a fill electrolyte impregnating the capacitor roll, as shown in FIG. 2 of the drawing. After the casing is sealed, the tantalum leads are cleaned and degreased if necessary by any suitable process, but the dielectric oxide film on the surface of the tantalum leads need not be removed. The leads are then immersed for 15 seconds in a sensitizing solution such as that of Example I above, and the excess solution allowed to drain. The adhering liquid film is air or oven dried, it being unnecessary to treat this film with a fixing or reducing agent. The leads are then immersed for 10–15 minutes in a nickel plating bath such as the Example II composition above, at a temperature of 90° C. More or less time will be required for such immersion depending upon the particular bath temperature and the composition, and the desired thickness of coating. As a result of the above-described treatment, a thin, uniform tightly adherent nickel coating about 0.1 mil thick is deposited on the tantalum lead surface. The leads are then rinsed with water and dried.

It has been found that equally good nickel coatings are obtained whether the tantalum has an oxide film thereon or not, and it is a feature of the invention that the described coating procedure may be employed without removing the tantalum oxide film.

Thereafter, when the capacitor is to be connected to another component in an electric circuit, the lead member of the other component, such as a copper wire lead, is readily soldered to the nickel-coated tantalum lead using conventional lead-tin solder with the application of heat.

Alternatively, the nickel-coated tantalum lead member may be further coated with a lead-tin solder coating, so that in the field it is necessary only to apply heat and any necessary flux with the lead of the other component in overlapping contact with the nickel-coated tantalum lead member.

There is thus provided by the invention a tantalum capacitor lead to which connection may be made by other lead members by a simple conventional soldering operation and providing thereby a joint having excellent mechanical and electrical properties equivalent to a continuous tantalum lead.

Although the invention is particularly advantageous for use in connecting tantalum leads of electrolytic capacitors and has been mainly so described, other applications of the invention will become readily apparent and the described process could be beneficially employed in rendering solderable tantalum members of other types not associated with capacitors.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. A joint structure comprising a tantalum member having a coating of palladium on the surface thereof, a tightly adherent nickel coating on the surface of the palladium-coated tantalum member, and a metallic member soldered to said nickel-coated tantalum member.

2. A lead structure for electrical capacitors comprising a tantalum lead member having a coating of palladium on the surface thereof, a tightly adherent nickel coating on the surface of the palladium-coated tantalum lead member, and another metallic lead member soldered to said nickel-coated tantalum member.

3. A lead structure for electrical capacitors comprising a lead member composed of tantalum having a dielectric anodic oxide film formed thereon, a coating of palladium on the surface of said film-formed tantalum lead member, a tightly adherent nickel coating on the surface of the palladium-coated tantalum lead member, and another metallic lead member soldered to said nickel-coated tantalum lead member.

4. In an electrical capacitor comprising a container, a pair of electrodes of tantalum metal wound into a roll and disposed within said container, a lead structure for at least one of said tantalum electrodes comprising an elongated tantalum member connected electrically to said one electrode and projecting exteriorly from the end of the container, said one electrode and tantalum lead member having a dielectric oxide film formed thereon, said tantalum lead member having a palladium coating on the exterior portion thereof, and a coating of nickel deposited on and firmly adhering to the palladium-coating tantalum lead member.

5. In an electrical capacitor comprising a container, a pair of electrodes of tantalum metal wound into a roll and disposed within said container, a lead structure for at least one of said tantalum electrodes comprising an elongated tantalum member connected electrically to said one electrode and projecting exteriorly from the end of the container, said one electrode and tantalum lead member having a dielectric oxide film formed thereon, said tantalum lead member having a palladium coating on the exterior portion thereof, a coating of nickel deposited on and firmly adhering to the palladium-coated tantalum lead member, and a solderable metallic lead member soldered to the nickel-coated tantalum lead member.

6. In an electrical capacitor comprising a container a pair of electrodes of tantalum metal wound into a roll and disposed within said container, a lead structure for at least one of said tantalum electrodes comprising an elongated tantalum member connected electrically to said one electrode and projecting exteriorly from the end of the container, said one electrode and tantalum lead member having a dielectric oxide film formed thereon, said tantalum lead member having a palladium coating on the exterior portion thereof, a coating of nickel deposited on and firmly adhering to the palladium-coated tantalum lead member, and a coating of solderable metallic material deposited on the nickel-coated tantalum lead member.

References Cited in the file of this patent

UNITED STATES PATENTS

| | | |
|---|---|---|
| 617,375 | Voigt | Jan. 10, 1899 |
| 2,332,891 | Clark | Oct. 26, 1943 |
| 2,473,888 | Jordan | June 21, 1949 |
| 2,814,589 | Waltz | Nov. 26, 1957 |
| 2,871,425 | Burnham | Jan. 27, 1959 |
| 2,900,579 | Rogers | Aug. 18, 1959 |